US012801847B2

(12) United States Patent
Marrotte

(10) Patent No.: US 12,801,847 B2
(45) Date of Patent: Nov. 17, 2026

(54) SYSTEMS AND METHODS TO GENERATE MEDIA FROM SEED PHRASES

(71) Applicant: Dell Products, L.P., Round Rock, TX (US)

(72) Inventor: Michael Marrotte, Windermere, FL (US)

(73) Assignee: Dell Products L.P., Round Rock, TX (US)

( * ) Notice: Subject to any disclaimer, the term of this patent is extended or adjusted under 35 U.S.C. 154(b) by 185 days.

(21) Appl. No.: 18/458,823

(22) Filed: Aug. 30, 2023

(65) Prior Publication Data

US 2025/0077771 A1 Mar. 6, 2025

(51) Int. Cl.

*G06F 40/20* (2020.01)
*G06F 40/242* (2020.01)
*G06F 40/279* (2020.01)
*G06Q 20/36* (2012.01)

(52) U.S. Cl.

CPC .......... *G06F 40/279* (2020.01); *G06F 40/242* (2020.01); *G06Q 20/3672* (2013.01)

(58) Field of Classification Search

CPC ...... G06F 40/279; G06F 40/242; G06F 9/451; G06F 8/38; G06F 21/6245; G06F 21/6218; G06F 21/6263; G06F 21/6254; G06Q 20/3672; G06Q 20/065; G06Q 20/123; G06N 20/00; G06N 3/044; G06N 3/02; G06N 3/0442; G06N 3/0455; G06N 3/045; G06N 3/0464; G06N 3/047; G06N 3/0475; G06N 3/048; G06N 3/088; G06N 3/0895; G06N 3/09; G06N 3/091; G06N 3/092; G06N 3/094; G06N 3/096; G06N 3/0985; G06N 20/20; G06N 20/10; G06N 3/08; G06V 20/20; G06V 20/50; G06V 20/52; G06V 20/53; G06V 20/54; G06V 20/60; G06V 20/62; G06V 20/63; G06V 20/635

See application file for complete search history.

(56) References Cited

U.S. PATENT DOCUMENTS 6,737,983 B1 * 5/2004 Temple .................... G09F 9/33 340/815.45
2007/0136670 A1 * 6/2007 Broos .................... G06Q 30/06 715/744
2021/0110021 A1 * 4/2021 Whitney ................. G06F 21/46
2023/0252456 A1 * 8/2023 Rapowitz ........... G06Q 20/3674 705/71

(Continued)

FOREIGN PATENT DOCUMENTS

WO 2023141374 A1 7/2023

OTHER PUBLICATIONS

McBryan, T., Renaud, K., & Siebert, J. P. (2014). An Investigation into the use of Images as Password Cues. arXiv preprint arXiv:1407.8004. (Year: 2014).*

*Primary Examiner* — Edgar X Guerra-Erazo
(74) *Attorney, Agent, or Firm* — Fogarty LLP

(57) ABSTRACT

Systems and methods support secure storage and use of a cryptographic seed phrase. In one example, a user may enter a text string of the seed phrase into an artificial intelligence (AI) art generator. The AI art generator generates art based upon the text string, where the resulting art is sufficiently non-literal that it may serve as a mnemonic device to a wallet owner, but its meaning would be underivable to someone other than the wallet owner.

20 Claims, 5 Drawing Sheets

(56) References Cited

U.S. PATENT DOCUMENTS

| | | | | |
|---|---|---|---|---|
| 2023/0394470 | A1* | 12/2023 | Mancuso | G06Q 20/3674 |
| 2024/0320867 | A1* | 9/2024 | Bean | G06F 40/30 |
| 2025/0158816 | A1* | 5/2025 | Wasily | H04L 9/3226 |

* cited by examiner

SYSTEMS AND METHODS TO GENERATE MEDIA FROM SEED PHRASES

FIELD

The present disclosure relates to generating media from seed phrases and more particularly to artificial intelligence (AI)-based tools for generating media based on seed phrases.

BACKGROUND

Cryptocurrencies are digital or virtual currencies that use cryptography for secure transactions. They operate on decentralized networks, typically based on blockchain technology to provide transparency, immutability, and resistance to censorship. Bitcoin, launched in 2009, was the first cryptocurrency and remains the most recognized and widely used. As the popularity of cryptocurrencies grew, a diverse range of alternative coins, or "altcoins," emerged, each with unique features and use cases.

To store, manage, and facilitate transactions involving these digital assets, cryptocurrency wallets are employed. These wallets come in various forms, including software-based wallets, hardware wallets, and paper wallets. A wallet may contain keys that allow a user to access and control their crypto holdings securely. The choice of wallet depends on factors such as convenience, security, and the user's intended level of engagement with the cryptocurrency ecosystem. As the crypto space continues to evolve, understanding both the coins themselves and the intricacies of wallet management becomes more desirable.

SUMMARY OF THE DISCLOSURE

In various embodiments, an information handling system (IHS) includes: one or more processors; one or more memory devices coupled to the processors, the memory devices storing computer-readable instructions that, upon execution by the one or more processors, cause the IHS to: prompt a user to enter a text string representing a seed phrase; receive the text string from the user via a user interface (UI); employ a trained artificial intelligence (AI) model to generate visual media from the text string, wherein the visual media includes a representation of at least one concept in the text string; and display the visual media via the UI.

In various embodiments, a method includes: acquiring a seed phrase, wherein the seed phrase includes a plurality of words, each of the words being drawn from a dictionary and mapping to a respective portion of a crypto asset wallet key; entering the seed phrase into a user interface (UI), further including entering a command into the UI to cause an artificial intelligence (AI) application to generate a visual artwork from the seed phrase; receiving the visual artwork via the UI, wherein the visual artwork includes visual media that depicts, non-literally, at least one different concept for each word of the plurality of words; and displaying the visual artwork in an unsecure location.

In various embodiments, a computer-readable storage device having instructions stored thereon for generating a mnemonic artwork via a console operating on an IHS (Information Handling System), wherein execution of the instructions by one or more processors of the IHS causes the one or more processors to: prompt a user to enter a text string representing a seed phrase; receive the text string from the user via a user interface (UI); employ a trained artificial intelligence (AI) model to generate visual media from the text string, wherein the visual media includes a representation of at least one concept in the text string; and display the visual media via the UI.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
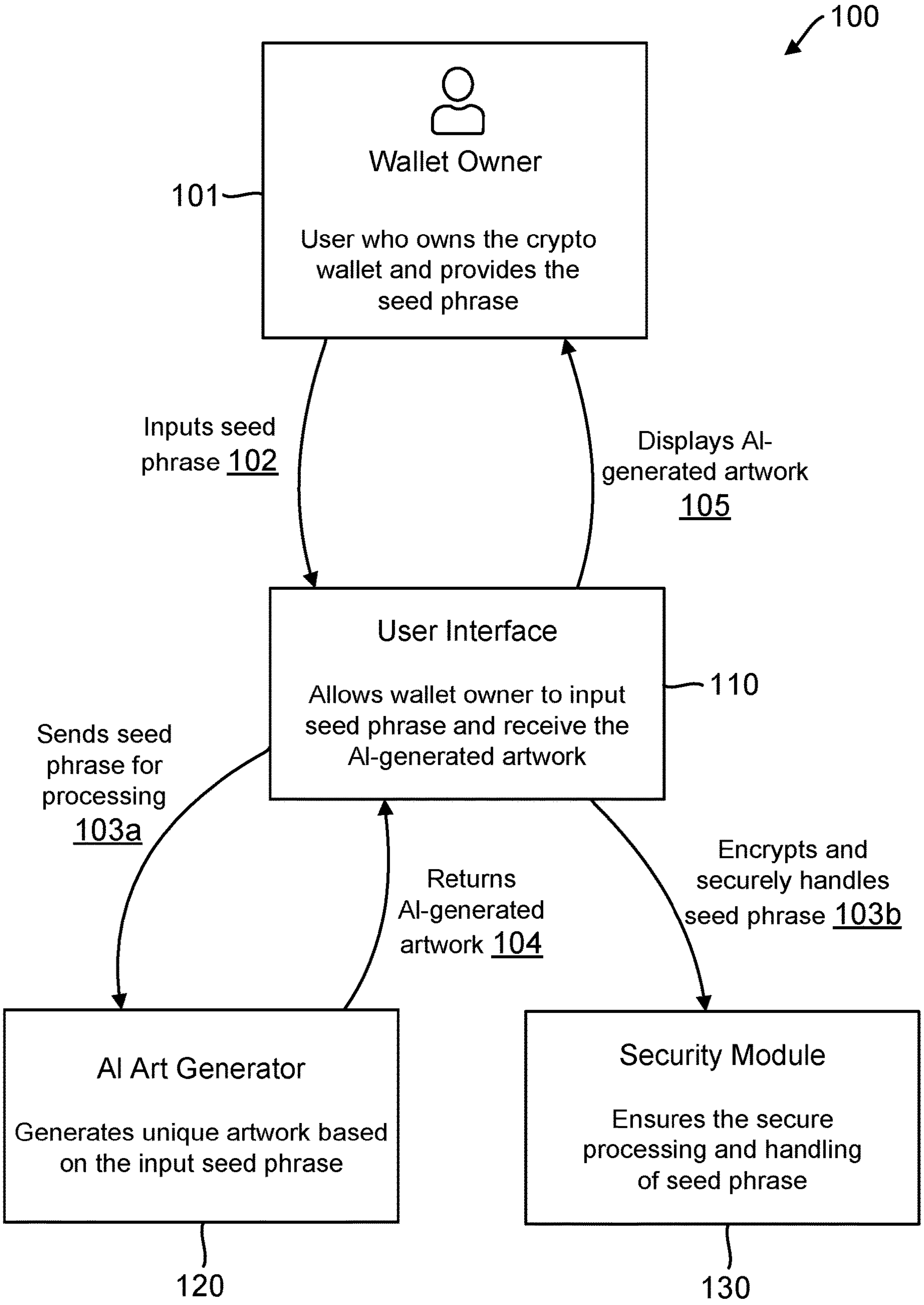
FIG. 1 is a simplified block diagram of an example method 100 for creating AI-generated mnemonic media, according to one embodiment.

In the following description, numerous specific details are set forth in order to provide a thorough understanding of embodiments of the present disclosure. It will be apparent to one skilled in the art that embodiments of the present disclosure may be practiced without some of these specific details. Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present disclosure have been illustrated and described, the disclosure is not limited to these embodiments only. Numerous modifications, changes, variations, substitutions, and equivalents will be apparent to those skilled in the art, without departing from the scope of the disclosure, as described in the claim.

A crypto asset wallet may include a digital tool designed to securely store, manage, and facilitate transactions involving various types of cryptocurrencies and other crypto assets. These wallets play a role in the cryptocurrency ecosystem by providing users with a way to store their private keys, which are used for accessing and controlling their crypto assets. A private key may include a cryptographic code that grants ownership of specific digital assets on a blockchain. It is usually a string of characters that, when matched with a corresponding public key, enables the user to prove ownership and execute transactions on the blockchain.

The private key's significance lies in its ability to sign transactions and cryptographic messages, verifying the authenticity of the user's actions. When a user initiates a crypto asset transaction, the private key is used to create a digital signature that confirms the transaction's legitimacy. The network then verifies the signature, ensuring that the transaction is valid and that the user has the authority to transfer the associated assets, such as coins.

Users may adopt wallet management practices to safeguard these private keys and ensure the security of one's crypto asset holdings. There are various types of crypto asset wallets available, each with its own security features and accessibility options. Software-based wallets are applications that can be installed on computers or mobile devices, providing a convenient way to access and manage crypto assets. Hardware wallets, on the other hand, are physical devices that store private keys offline, offering enhanced security by isolating keys from potential online threats. Paper wallets involve printing or writing down private keys on paper, keeping them physically separated from digital networks.

Regardless of the wallet type, users may prefer security measures to protect their private keys from theft, loss, or unauthorized access. This often includes practices like enabling two-factor authentication, using strong and unique passwords, and regularly backing up wallet information. In the rapidly evolving world of crypto assets, where security breaches and hacks are not uncommon, responsible wallet management may help to ensure the safety and longevity of one's crypto assets.

One advancement in the world of crypto asset wallet security includes the introduction of seed phrases, also known as recovery phrases or mnemonic phrases. A seed phrase may include a sequence of usually 12 to 24 seemingly random words that serve as a human-readable representation of the private key. This innovation addresses the challenge of securely storing and backing up private keys, as these phrases can be easily written down or memorized by users, reducing the risk of digital loss while maintaining security.

Seed phrases may be generated algorithmically from private keys and are usually deterministic, meaning that the same seed phrase will always generate the same private key. When creating a new wallet or during the initial setup of a wallet, users may be presented with their seed phrase by their wallet application. The user may be instructed to keep this phrase safe and confidential, as anyone who gains access to it can potentially access the associated crypto assets.

Users typically keep their seed phrases in secure and offline locations. Some users may opt to write the seed phrase on paper and store it in a safe deposit box, a physical vault, or other secure storage options. Others may engrave the seed phrase on metal plates to ensure durability against physical damage, water, or fire. Digital alternatives may include storing encrypted copies of the seed phrase on offline devices or using specialized hardware designed for securely storing seed phrases.

The use of seed phrases may simplify the process of wallet recovery in case of device loss or failure. When restoring an existing wallet, a user may input their seed phrase to the wallet application, and the software derives the private keys and cryptographic information necessary to access the funds. Such a process may reduce or eliminate the need to manually back up individual private keys, making the process more user-friendly and decreasing the likelihood of errors.

However, with the convenience of seed phrases comes a heightened responsibility for their security. For instance, if the user stores the seed phrase in an unsecured digital environment, it could be vulnerable to online attacks. Additionally, users may strive to avoid sharing their seed phrase with anyone and remain cautious of potential phishing attempts.

Artificial intelligence (AI) may offer the potential to create media, such as text, music, and visual art. Various implementations of the disclosure may use generative AI to create personalized and secure mnemonic devices for seed phrase recall, without compromising crypto asset wallet security.

FIG. 1 is a simplified block diagram of an example method 100 for creating AI-generated mnemonic media, according to one implementation. Wallet owner 101 may include a person who owns a crypto wallet. In other words, the wallet owner 101 may include a human user who owns digital assets and has at least one key stored in a wallet application.

User interface 110 may be included within a wallet application, within the AI art generator 120, or included as part of another appropriate application. At action 102, the wallet owner 101 inputs the seed phrase to the user interface. In one example, the wallet owner 101 may type in text corresponding to the words of the seed phrase. In the present example, the seed phrase has already been generated. One example of seed phrase generation includes the technique associated with Bitcoin Improvement Proposal 0039, sometimes referred to as BIP39. In the BIP39 technique, there is an initial entropy length of, e.g., 128 bits. A checksum is generated for the bits, and the appended result of the entropy bits plus the checksum bits is then divided into groups of 11 bits each. Each group of 11 bits encodes a number from 0-2047, and the seed phrase generator may use the numbers associated with each group of bits as an index into a dictionary. The dictionary provides the words, each of the words in the seed phrase corresponding to an entry in the dictionary. Of course, other techniques for generating seed phrases and seed phrases of other sizes may be adapted for use in various embodiments.

An example of a seed phrase might include, "lemon, hotel, banana, evil, candle, jelly, fragile, glue, elephant, honey, damp, clarify." Of course, that is just an example, and the scope of implementations may be adapted to operate on any appropriate seed phrase generated from a seed phrase dictionary.

The wallet owner 101 enters the seed phrase into the user interface 110, and the user interface 110 sends the seed phrase for processing to the AI art generator 120 at action 103*a*. For instance, the user interface 110 may transmit the seed phrase over a network, such as the Internet, to the AI art generator 120, either encrypted or unencrypted. In another example, the user interface 110 and art generator 120 are part of the same application that runs on a single device such as the wallet owner's 101 local device, and the seed phrase may be provided over a bus or wire or simply read from memory without being transmitted over a network.

In yet another example, the security module 130 provides end-to-end encryption between the user interface 110 and the AI art generator 120 so that the seed phrase may not be intercepted between the user interface 110 and the AI art generator 120 at action 103*b*. Furthermore, the security module 130 may avoid storing the seed phrase, at least for longer than is required when providing the seed phrase to the AI art generator 120. As a result, the seed phrase may be encrypted and unable to be stolen from the user interface 110 or the AI art generator 120 at action 103*b*.

The AI art generator 120 may include one or more AI models trained to generate unique and meaningful media based on the input seed phrase. For instance, the one or more AI models may generate media, such as visual art or audio art, to capture concepts from each word of the phrase in a personalized way.

The scope of implementations may use any appropriate generative AI tool now known or later developed. Examples of currently available AI tools include those available under the marks, SCRIBE, JASPER, CHATGPT, DALL-E, GENERATIVE DESIGN, WORDTUNE, GITHUB COPILOT, VEED, and SPEECHIFY. Some of those AI tools generate text, whereas other of those AI tools may generate audio and/or visual media. For instance, the tool known as CHATGPT is based on a large language model, including a trained deep-learning model that generates text in a human-like fashion. The tool DALL-E uses a trained diffusion model that is conditioned on image embeddings. It is configured to receive text, relate the text representation to an image representation through word embeddings, and convert the word embeddings into objects and images that imply the meaning of the input text. Generative adversarial networks (GANs) and Variational Autoencoders (VAEs) are additional examples of models that may be used for image generation.

The tools have in common the ability to receive user commands, including user input, one or more trained models generating digital content from the user commands and input, and output mechanisms to provide the generated media (text, images, video, sounds, etc.) to a user, a network, or another application.

At actions 103*a* and 103*b*, the AI art generator 120 receives the seed phrase. An example of a seed phrase is given above. Actions 103*a* and 103*b* may also include receiving a command to generate digital media based on the seed phrase. For instance, the AI art generator 120 may have a robust text input that allows for additional and more nuanced requests to specify the output. The following includes an example request to the AI art generator 120, made through the user interface 110 by the wallet owner 101, and that may be used in an implementation for a particular example seed phrase.

Wallet owner: "I have a phrase of 12 words. The phrase is, 'lemon, hotel, banana, evil, candle, jelly, fragile, glue, elephant, honey, damp, clarify.' Create a visual collage that includes one visual element per word in the phrase. The visual elements should not be literal representations of the words in the phrase but instead should be symbols that imply the words in the phrase."

AI art generator: "I have generated your collage." [Collage rendered at user interface 110 on a portion that is separate from text.]

The AI art generator 120 may then return the AI-generated artwork to the wallet owner 101 via the user interface 110 at action 104. The AI-generated artwork may include digital media in any appropriate format.

Figure 2:
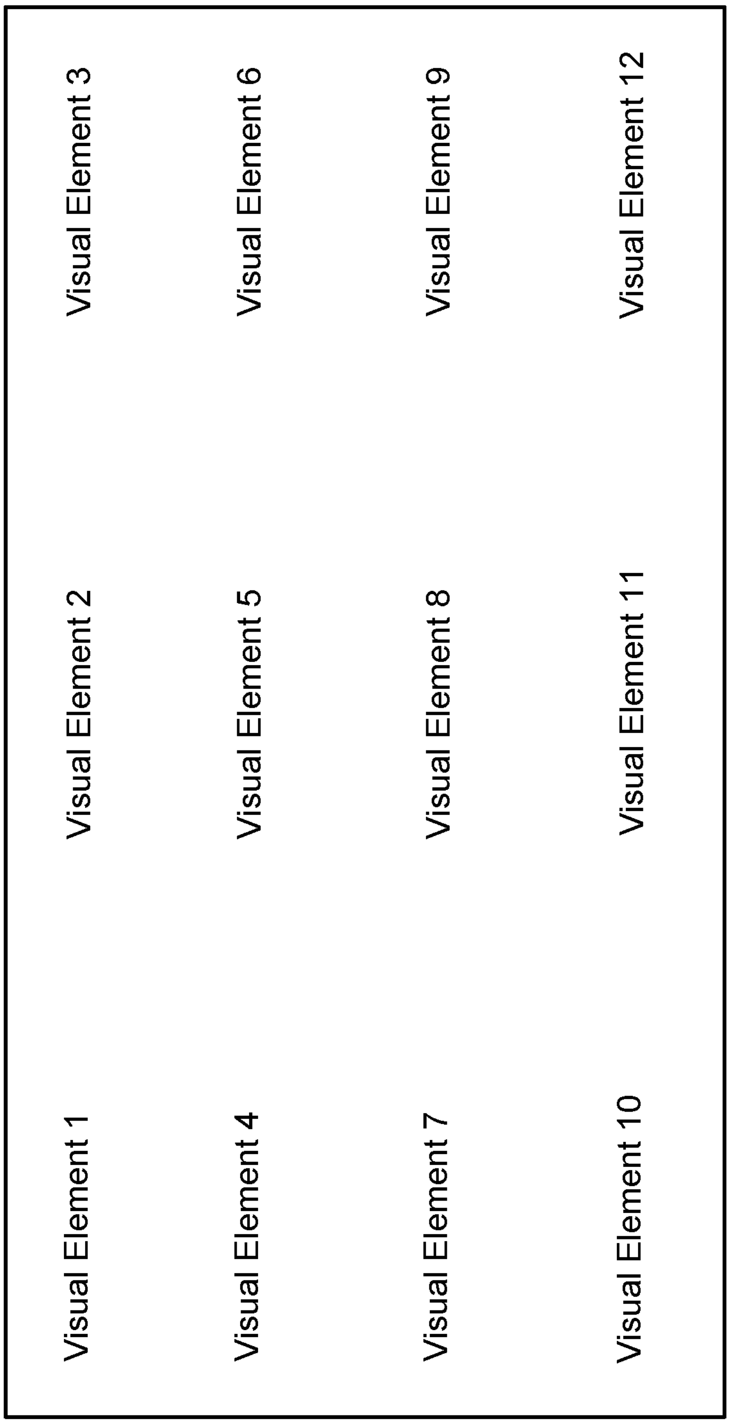
FIG. 2 is an example of output visual media, according to one embodiment.

An example of output visual media is shown at FIG. 2, according to one implementation. The visual media of FIG. 2 includes 12 visual elements 1-12, one per word in the phrase. Each of the visual elements 1-12 may include any AI-generated art based on the phrase and the instructions. For instance, the AI art generator 120 may generate a visual element 1 depicting a puckered mouth to indicate sourness, which implies a lemon but does not literally represent a lemon. Another example may be generating AI visual element 2 to illustrate a bellboy or hotel maid to imply a hotel. The other visual elements 3-12 may include similarly conceptually-related illustrations, each implying a respective word of the phrase.

In some implementations, the order of the visual elements 1-12 may match an order of the words of the seed phrase, thereby preserving the word order characteristic of the seed phrase. However, in other implementations, the order of the visual elements may differ from the order of the words of the phrase. Preservation of word order may or may not be specified in instructions from the wallet owner 101 at actions 103*a,b*.

A feature of some AI art generators is that there is usually inherent randomness in its neural network transformations when converting seed phrases into artwork. In other words, it is unlikely that providing the same seed phrase and same instructions in a subsequent session would generate the same visual elements of FIG. 2. Furthermore, it would be unlikely that an art-to-text AI generator would be able to generate the same seed phrase given the visual media of FIG. 2.

Moreover, the AI art generator 120 may introduce a layer of noise to the generated image, escalating the indeterministic nature of the output. Along with the potential one-way function of the transformation that is difficult to reverse, and the possibility of a many-to-one mapping, these factors may make retrieving the original seed phrase challenging to a malicious person who attempts to reverse engineer the seed phrase from the art.

The wallet owner 101 may determine that the generated art is satisfactory by examining the art and determining whether the art serves as a mnemonic aid. On the other hand, the wallet owner 101 may determine that the art has one or more visual images that are indecipherable and may be unlikely to serve as a mnemonic aid. Similarly, the wallet owner 101 may determine that one or more visual images are too literal and cause a security concern. Should the wallet owner 101 determine that the generated art is unsatisfactory, the wallet owner 101 may enter the seed phrase and either the same instructions or different instructions into the user interface 110 to cause the AI art generator 120 to generate another piece of art. The wallet owner 101 may review the further piece of generated art and keep that further piece of generated art or determine to repeat the process one or more times to acquire satisfactory generated art. In one example, the wallet owner 101 may perform the process multiple times and decide to keep only a single best piece (or a few multiple best pieces) of generated art and delete the others.

At action 105, the wallet owner 101 may display the AI-generated artwork. For instance, the wallet owner 101 may download a file corresponding to the artwork via the user interface 110. The wallet owner 101 may then save the image on any appropriate device and to any appropriate quantity of devices. For instance, the wallet owner 101 may save the artwork as a file onto the wallet owner's laptop, as a photo image in a photo folder on a smart phone, and/or the like. In some instances, the wallet owner 101 may choose to print the artwork onto a physical medium, such as paper, and display the paper on a wall at a home or office. The wallet owner 101 may, additionally or alternatively, save the artwork as a background on a home screen of a laptop, phone, smartwatch, etc.

A feature of the example of FIGS. 1-2 is that the AI-generated artwork may be indecipherable to a third party who does not know the seed phrase. But the AI-generated artwork may have meaning to the wallet owner 101, and as long as the wallet owner 101 does not disclose the meaning or origin to another human, then the artwork may serve as a secure mnemonic device. Specifically, other humans are unlikely to grasp the meaning of the art, especially so when the visual elements 1-12 are not literal and merely imply concepts related to the words of the seed phrase. Therefore, displaying the AI-generated artwork in a way in which third parties may view the artwork may cause a minimal security risk or no security risk at all, depending upon the crypto-sophistication of the audience and the literal versus conceptual qualities of the artwork.

Sometime in the future, the wallet owner 101 may desire to access the seed phrase. The wallet owner 101 may examine the generated art, use the generated art as a mnemonic aid to remember the seed phrase, and then enter the remembered seed phrase in a wallet application if appropriate.

Figure 3:
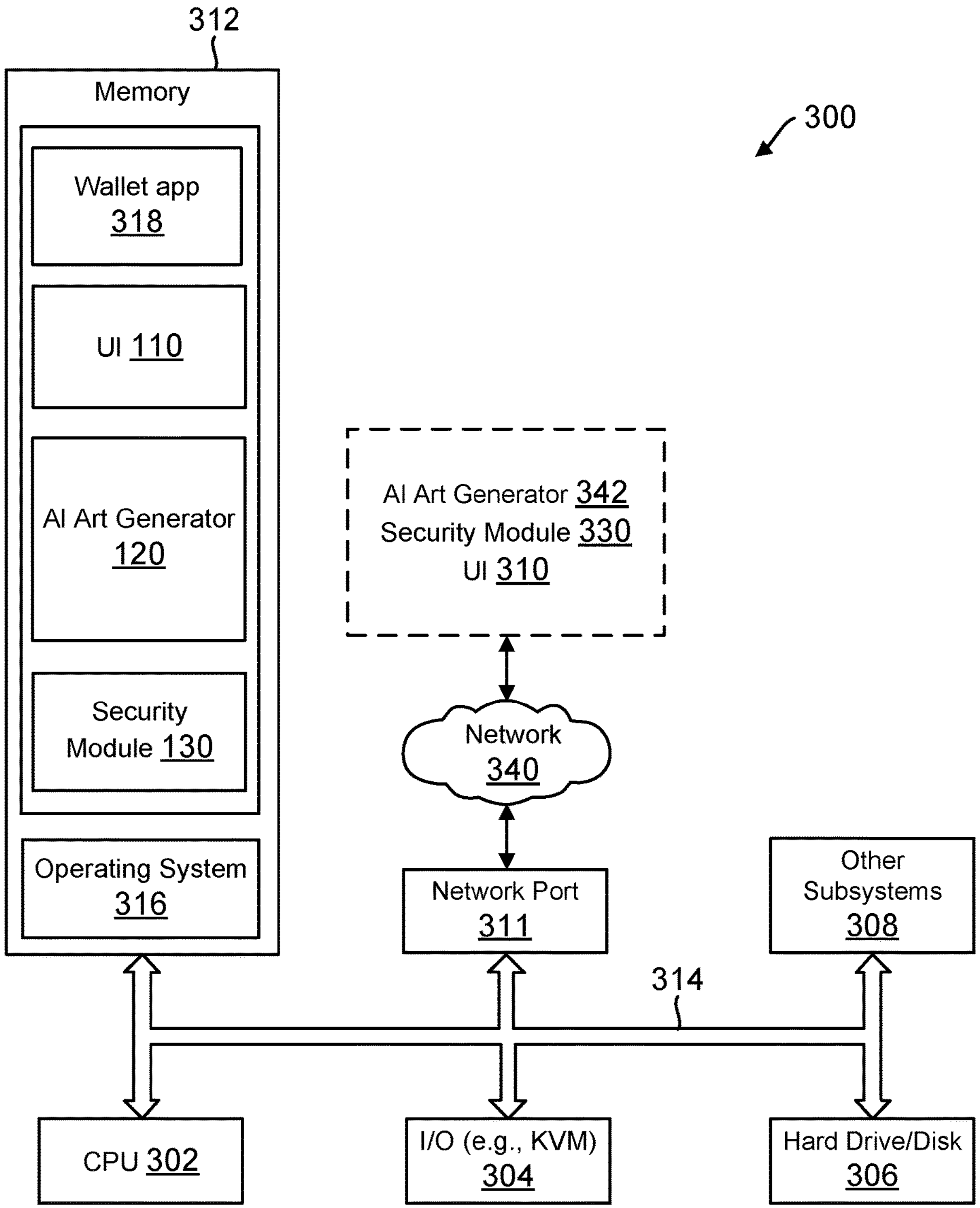
FIG. 3 is a diagram illustrating certain components of an information handling system (IHS), according to embodiments, that is configured to support generation and use of AI-generated artwork as a mnemonic device, according to one embodiment.

FIG. 3 is an illustration of an Information Handling System (IHS) 300 that can be used to implement the systems and methods of the present disclosure, and in particular, is configured to support AI generation of art based on seed phrases. The information handling system 300 includes a processor (e.g., central processor unit or "CPU") 302, input/output (I/O) devices 304, such as a display, a keyboard, a mouse, a touchpad or touchscreen, and associated controllers, a storage drive 306, and various other subsystems 308.

In various embodiments, the information handling system 300 also includes network port 311 operable to connect to a network 340, such as the Internet. The information handling system 300 likewise includes system memory 312, which is interconnected to the foregoing via one or more buses 314. System memory 312 further comprises operating system (OS) 316.

Memory 312 may include instructions to implement applications which run on operating system 316. For instance, wallet application 318 may run on operating system 316. Wallet application 318 may perform some or all of the functions described in more detail above with respect to a crypto wallet. For instance, wallet application 318 may be a digital tool designed to securely store, manage, and facilitate transactions involving a single type of cryptocurrency or multiple types of cryptocurrencies, and even non-currency crypto assets. Wallet application 318 may also generate a seed phrase based upon a user's private key.

User interface 110 is described in more detail above with respect to FIG. 1. As implemented at IHS 300, user interface 110 may include its own application, a module within the wallet application 318, or a module within AI art generator 120. User interface 110 may be configured to provide input and output to the user at input output devices 304. For instance, the user interface 110 may provide visual output, sound output, and the like and may receive input in the form of keystrokes, touchscreen selection, mouse inputs, and the like. The user interface 110 may provide input and output functionality in any appropriate form or medium.

AI art generator 120 is described in more detail above with respect to FIG. 1. AI art generator 120 may be implemented at IHS 300 as its own application, as a module of another application, or the like. AI art generator 120 may be configured to receive input via the UI 110 and to generate unique and meaningful media based on the received input. For instance, AI art generator 120 may receive a text string of the seed phrase and generate media therefrom.

Security module 130 is described in more detail above with respect to FIG. 1. As implemented at IHS 300, security module 130 may be its own application or it may be a module within the AI art generator 120 or the UI 110. The security module 130 functions to keep the seed phrase text string safe as it is transmitted from the UI 110 to the AI art generator 120. For instance, the security module 130 may provide end-to-end encryption and may delete the text string, either encrypted or not, soon after the text string becomes unneeded by the AI art generator 120.

In one example implementation, the IHS 300 is a personal device, such as a smart phone or laptop, associated with an end user, such as a wallet owner. An example of a wallet owner is described above with respect to FIG. 1. In such an embodiment, the wallet application 318, the UI 110, the AI art generator 120, and the security module 130 are implemented as one or more applications that run on operating system 316 on the wallet owner's IHS 300. Such an implementation may provide security by avoiding transmission of sensitive data, such as a private key or a seed phrase, over network 340. However, AI art generator 120 may require an amount of computing power that may be impractical or inconvenient on a personal device.

In another example implementation, the art generating functionality is implemented in the cloud and may be accessed over network 340. This is illustrated by AI art generator 342, security module 330, and UI 310. AI art generator 342 corresponds to AI art generator 120, security module 330 corresponds to security module 130, and UI 310 corresponds to the UI 110, but each of items 342, 330, and 310 are cloud-based applications. In such an instance, UI 110, AI art generator 120, and security module 130 may be omitted from memory 312 or may have some amount of functionality remaining to run on operating system 316. In one example, UI 310 is configured to communicate with a human user via a web browser application (not shown) running on operating system 316.

A benefit of a cloud-based embodiment is that much of the processing power required for AI art generation is offloaded to a computer server (not shown) at the cloud, thereby leaving the compute and memory capacity on the IHS 300 for other applications. On the other hand, there may be some security risk in transmitting information from the IHS 300 over the network 340 to the AI art generator 342. Nevertheless, security module 130 may provide end-to-end encryption, thereby mitigating some security risk.

Figure 4:
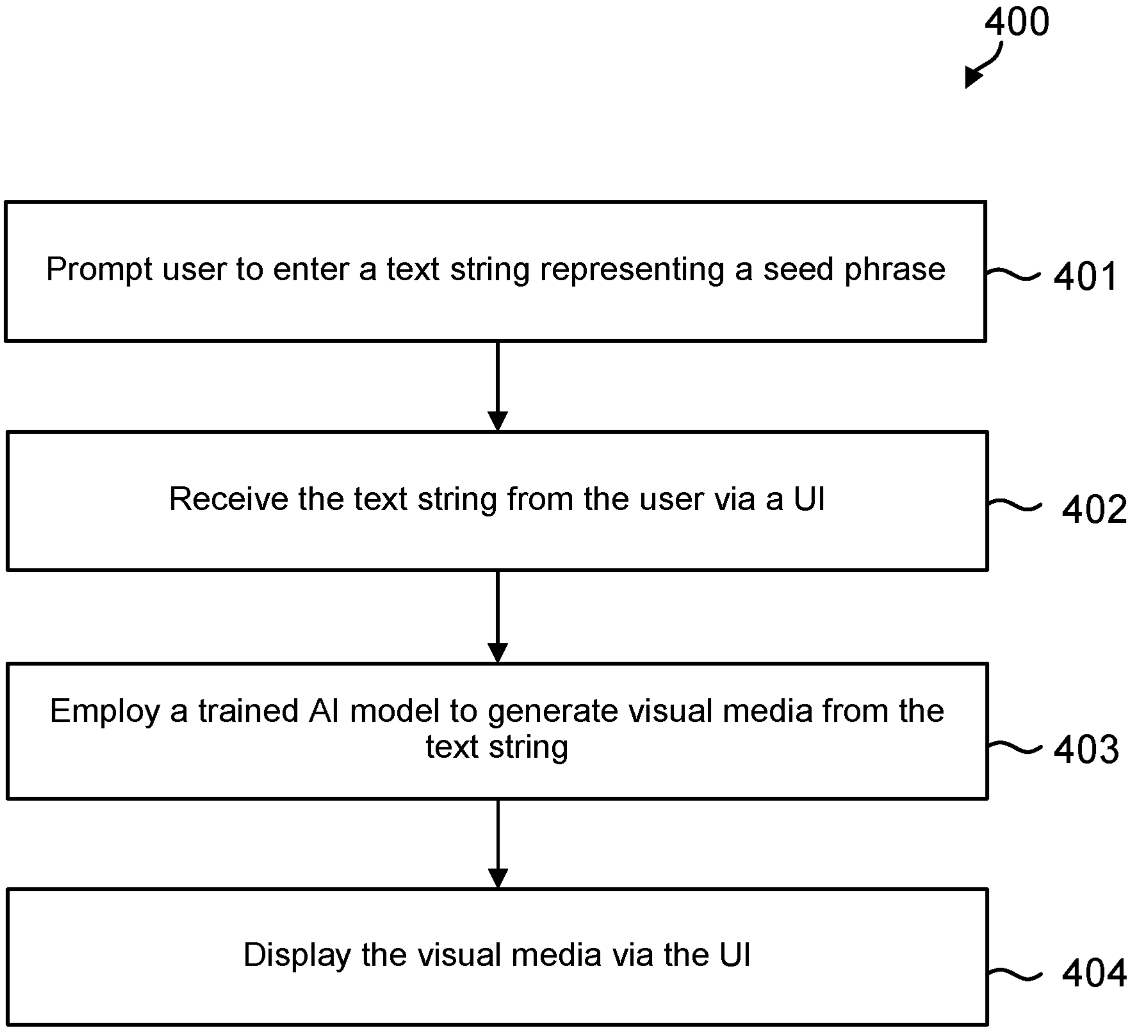
FIG. 4 is a flowchart describing certain steps of a method, according to embodiments, for generating and displaying AI-generated artwork.

FIG. 4 is an illustration of an example method 400 for generating mnemonic artwork from crypto seed phrases, according to one embodiment. Method 400 may be performed by an IHS 300, one or more server computers over a network such as network 340, or a combination thereof. For instance, a computer may read and execute computer instructions from non-transitory computer readable media to provide the art generating functionality described above with respect to applications 110, 120, 130, and/or 342, 330, 310.

At action 401, the art generating functionality prompts a user to enter a text string representing a seed phrase. For instance, a UI such as UI 110 or 310, may provide a visual and/or audio prompt and may direct the wallet owner to enter the seed phrase as a text string.

At action 402, the art generating functionality receives the text string from the user via the UI. In one example, the user may use a keyboard or other input device to enter the seed phrase as the text string in the UI. Action 402 may include the user entering each word of the seed phrase in separate transactions. In another example, action 402 may include the user entering the entire text string as a whole. The UI may receive the text string, such as using separate fields for each word or using a single field for the whole text string, where the words are separated by either punctuation or spaces.

Action 402 may also include the wallet owner entering a command into the UI, wherein the command instructs the trained AI model to generate visual media from the text string. The command may also include additional instructions about how to generate visual media from the seed phrase, such as whether to preserve a word order in the visual output, whether to be more literal or less literal, whether to include color, whether to make the visual media more cartoonlike or more realistic, etc.

At action 403, the trained AI model is employed to generate visual media from the text string. In some instances, the UI may pass each individual word of the text string separately to a trained AI model. In another example, the UI may pass the text string as a whole to the trained AI model. If appropriate, the UI may also pass a command from the wallet owner to the AI model.

In any event, at actions 402-403, the art generating functionality may provide security for the transaction, such as by providing end-to-end encryption for the text string and deleting any information after a period of time or after the information is unneeded or undesired.

At action 404, the art generating functionality displays the visual media. For instance, the UI may receive the generated visual media from the trained AI model, and the UI may display the visual media on a same screen as is used for inputting the text string. Alternatively or additionally, the UI may display the visual media on a different screen.

In one example, the UI may pass each word of the seed phrase to the trained AI model one at a time and may receive output from the trained AI model one at time. In such an embodiment, the UI may then receive a plurality of illustrations from the trained AI model and aggregate each of those illustrations into the final visual media. In another example, the UI may pass the entire text string to the trained AI model, and trained AI model may then generate the visual media based on the entire seed phrase and then transfer the visual media to the UI.

The visual media may include at least one visual indication for each word of the seed phrase. For instance, if there are 12 words in the seed phrase, the visual media may include 12 visual indications, each one of the visual indications corresponding to a respective word in the seed phrase. As noted above, the visual indications may be non-literal, instead suggesting or implying a concept associated with each word. Furthermore, one characteristic of a seed phrase is the order of the words, and the visual media may or may not preserve the word order. In one example, the trained AI model may receive a command from the wallet owner, via the UI, to preserve a word order in the visual media. An example is shown in FIG. 2, where the word order may correspond to the visual media in a 4×3 grid, progressing up-to-down and left-to-right.

Action 404 may include displaying the visual media in an unsecure location. Examples of unsecure locations may include locations that are susceptible to untrustworthy entrants, such as homes, offices, and/or the like. In one example, the wallet owner may set the visual media as a background on a computer monitor at the wallet owner's office. Even though coworkers and visitors may occasionally see the visual media, they may not be aware that the visual media represents a seed phrase. In another example, the wallet owner may set visual media as a background on the wallet owner's smart phone. Again, people who have not been told the significance of the visual media are unlikely to be able to discern the significance.

The scope of implementations is not limited to the series of actions shown in FIG. 4. Rather, other implementations may add, omit, rearrange, or modify some of the actions. In one example, the wallet owner may determine to repeat method 400 to generate multiple candidate visual media from a same seed phrase or to generate multiple visual media from multiple seed phrases.

Figure 5:
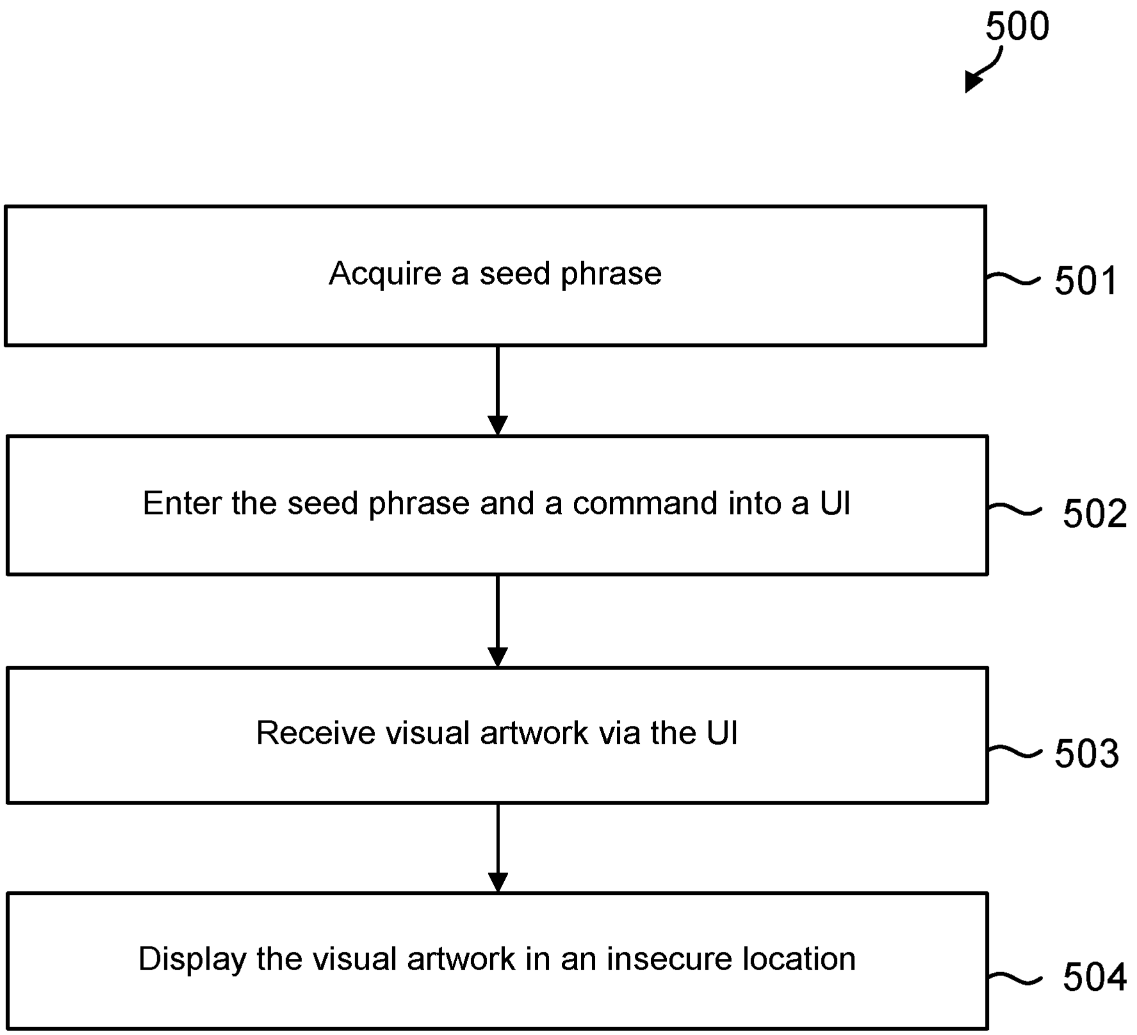
FIG. 5 is a flowchart describing certain steps of a method, according to embodiments, where generating and displaying AI generated artwork.

FIG. 5 is an illustration of an example method 500 generating artwork, according to one embodiment. Method 500 may be performed by a human user of an IHS, such as wallet owner 101 FIG. 1.

At action 501, the wallet owner acquires a seed phrase. For instance, the seed phrase may be generated by a crypto asset wallet application, such as application 318 of FIG. 3. The seed phrase may include a plurality of words, wherein each of the words are drawn from a dictionary. Each of the words may map to a respective portion of a crypto asset wallet key. One example is given above using BIP39, where a key and its checksum bits are divided into groups of 11 bits, and each of those groups of bits corresponds to a word in a dictionary. The dictionary may be specific to the particular protocol (e.g., BIP39) and may limit the universe of words from which a seed phrase may be constituted.

At action 502, the wallet owner enters the seed phrase and a command into a UI. For instance, the user may use a keyboard to type in the words into their own entry fields on the UI or may enter the entire seed phrase into a single field. The user may also enter a command for the AI art generator, where such command may include instructions as to how to generate visual media from the text string of the seed phrase.

At action 503, the wallet owner receives visual artwork via the UI. For instance, the AI art generator may generate visual artwork from the seed phrase and then pass that artwork back to the UI. The UI may then display the visual artwork, may display a prompt to view or download the visual artwork, or a combination thereof.

The visual artwork includes visual media that depicts, non-literally, at least one different concept for each word of the seed phrase. An example is shown above with respect to FIG. 2. At action 504, the wallet owner may display the visual artwork in an unsecure location. Examples of unsecure locations are described above with respect to FIG. 4.

Action 504 may include the wallet owner printing the visual artwork on a paper medium and then displaying the artwork on a wall at an office or a home. Action 504 may include, additionally or alternatively, setting the visual artwork as a background on a personal device or displaying it on an electronic frame or television. The wallet owner may also save the visual artwork as a file on a storage drive. As noted above, the visual artwork is unlikely to be recognizable as a representation of sensitive information because of the non-literal nature of the artwork. In the examples of FIGS. 4-5, the sensitive information is hiding in plain sight.

The scope of implementations is not limited to the series of actions shown in FIG. 5. Rather, other implementations may add, omit, rearrange, modify some of the actions. In one example, the wallet owner may determine to repeat method 500 to generate multiple candidate visual media from a same seed phrase or to generate multiple visual media from multiple seed phrases.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the implementation(s) described herein embrace all such modifications and changes and, accordingly, the above description should be regarded in an illustrative rather than a restrictive sense.

Although the implementation(s) is/are described herein with reference to specific embodiments, various modifications and changes can be made without departing from the scope of the present disclosure(s), as set forth in the claims below. Accordingly, the specification and figures are to be regarded in an illustrative rather than a restrictive sense, and all such modifications are intended to be included within the scope of the present disclosure(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An information handling system (IHS) comprising:

one or more processors;

one or more memory devices coupled to the processors, the memory devices storing computer-readable instructions that, upon execution by the one or more processors, cause the IHS to:

prompt a user to enter a plurality of individual words as a text string representing a seed phrase associated with a digital wallet;

receive the text string from the user via a user interface (UI);

receive a command to preserve an order of the individual words;

provide end-to-end encryption of the plurality of individual words between the UI and a trained artificial intelligence (AI) model;

employ the trained AI model to generate visual media from the text string, wherein the visual media includes a plurality of visual elements, one visual element per word, wherein the plurality of visual elements are arranged in a grid in an order matching the order of the individual words;

subsequent to employing the trained AI model, delete the text string; and display the visual media via the UI.

2. The IHS of claim 1, wherein the one or more memory devices store computer-readable instructions that, upon execution by the one or more processors, cause the IHS to:

receive the command from the user via the UI, wherein the command instructs the trained AI model to generate the visual media from the text string.

3. The IHS of claim 2, wherein the one or more memory devices store computer-readable instructions that, upon execution by the one or more processors, cause the IHS to:

transfer the command to the trained AI model along with the text string.

4. The IHS of claim 1, wherein the computer readable instructions to cause the IHS to display the visual media cause the IHS to:

display the visual media in an unsecure location.

5. The IHS of claim 1, wherein the computer-readable instructions to cause the IHS to prompt the user to enter the text string cause the IHS to:

separate the text string into the plurality of individual words, wherein each of the individual words is associated with a separate entry field.

6. The IHS of claim 1, wherein the computer-readable instructions to cause the IHS to employ the trained AI model cause the IHS to:

pass each individual word of the text string separately to the trained AI model.

7. The IHS of claim 1, wherein the computer-readable instructions to cause the IHS to employ the trained AI model cause the IHS to:

receive a plurality of illustrations from the trained AI model; and aggregate the plurality of illustrations into the visual media.

8. The IHS of claim 1, wherein the computer-readable instructions to cause the IHS to employ the trained AI model cause the IHS to:

pass the text string as a whole to the trained AI model.

9. A computer-readable storage device having instructions stored thereon for generating a mnemonic artwork via an IHS (Information Handling System), wherein execution of the instructions by one or more processors of the IHS causes the one or more processors to:

prompt a user to enter a plurality of individual words as a text string representing a seed phrase associated with a digital wallet;

receive the text string from the user via a user interface (UI);

receive a command to preserve an order of the individual words;

provide end-to-end encryption of the plurality of individual words between the UI and a trained artificial intelligence (AI) model;

employ the trained AI model to generate visual media from the text string, wherein the visual media includes a plurality of visual elements, one visual element per word, wherein the plurality of visual elements are arranged in a grid in an order matching the order of the individual words;

subsequent to employing the trained AI model, delete the text string; and display the visual media via the UI.

10. The computer-readable storage device of claim 9, further comprising instructions which when executed by the one or more processors cause the one or more processors to:

receive the command from the user via the UI, wherein the command instructs the trained AI model to generate the visual media from the text string; and transfer the command to the trained AI model along with the text string.

11. The computer-readable storage device of claim 9, wherein the instructions to cause the one or more processors to employ the trained AI model cause the one or more processors to:

receive a plurality of illustrations from the trained AI model; and aggregate the plurality of illustrations into the visual media.

12. A method comprising:

prompting a user to enter a plurality of individual words as a text string representing a seed phrase associated with a digital wallet;

receiving the text string from the user via a user interface (UI);

receiving a command to preserve an order of the individual words;

providing end-to-end encryption of the plurality of individual words between the UI and a trained artificial intelligence (AI) model;

causing the trained AI model to generate visual media from the text string, wherein the visual media includes a plurality of visual elements, one visual element per word, wherein the plurality of visual elements are arranged in a grid in an order matching the n order of the individual words;

subsequent to employing the trained AI model, deleting the text string; and displaying the visual media via the UI.

13. The method of claim 12, further comprising:

receiving the command from the user via the UI, wherein the command instructs the trained AI model to generate the visual media from the text string.

14. The method of claim 13, further comprising:

transferring the command to the trained AI model along with the text string.

15. The method of claim 12, wherein displaying the visual media comprises:

displaying the visual media in an unsecure location.

16. The method of claim 12, wherein prompting the user to enter the text string comprises:

separating the text string into the plurality of individual words, wherein each of the individual words is associated with a separate entry field.

17. The method of claim 16, wherein causing the trained AI model to generate the visual media comprises:

passing each individual word of the text string separately to the trained AI model.

18. The method of claim 12, wherein causing the trained AI model to generate the visual media comprises:

receiving a plurality of illustrations from the trained AI model; and aggregating the plurality of illustrations into the visual media.

19. The method of claim 12, wherein causing the trained AI model to generate the visual media comprises:

passing the text string as a whole to the trained AI model.

20. The method of claim 12, wherein the seed phrase is associated with a private key that provides access to the digital wallet.

* * * * *